United States Patent
Schad et al.

(10) Patent No.: US 8,831,057 B2
(45) Date of Patent: Sep. 9, 2014

(54) LASER DEVICE HAVING A GAS-PURGED LASER RESONATOR

(75) Inventors: Sven Schad, Rottweil (DE); Lutz Schuler, Bad Durrheim (DE); Jürgen Mösner, Brigachtal (DE)

(73) Assignee: TRUMPF Laser GmbH + Co. KG, Schramberg (DE)

( * ) Notice: Subject to any disclaimer, the term of this patent is extended or adjusted under 35 U.S.C. 154(b) by 0 days.

(21) Appl. No.: 14/112,755

(22) PCT Filed: Apr. 19, 2012

(86) PCT No.: PCT/EP2012/057129
§ 371 (c)(1),
(2), (4) Date: Nov. 19, 2013

(87) PCT Pub. No.: WO2012/143423
PCT Pub. Date: Oct. 26, 2012

(65) Prior Publication Data
US 2014/0064309 A1    Mar. 6, 2014

(30) Foreign Application Priority Data

Apr. 20, 2011   (DE) .................... 10 2011 007 730

(51) Int. Cl.
*H01S 3/223* (2006.01)
*H01S 3/22* (2006.01)
*H01S 3/00* (2006.01)
*H01S 3/02* (2006.01)
*H01S 3/094* (2006.01)
*H01S 3/23* (2006.01)

(52) U.S. Cl.
CPC . *H01S 3/02* (2013.01); *H01S 3/094* (2013.01); *H01S 3/23* (2013.01); *H01S 3/027* (2013.01)
USPC ................................. 372/33; 372/58; 372/59

(58) Field of Classification Search
CPC ........... H01S 3/02; H01S 3/027; H01S 3/082; H01S 3/09
USPC .................................................. 372/33, 58, 59
See application file for complete search history.

(56) References Cited

U.S. PATENT DOCUMENTS

2003/0007537 A1    1/2003  Pang et al.
2003/0227957 A1   12/2003  Pang et al.
2009/0141746 A1*   6/2009  Fujikawa et al. ............... 372/10

FOREIGN PATENT DOCUMENTS

DE   WO2010075254    *  7/2010
WO      2010075254 A2    7/2010

OTHER PUBLICATIONS

German Office Action dated Nov. 25, 2011.
International Search Report dated Jul. 5, 2012.

\* cited by examiner

*Primary Examiner* — Armando Rodriguez
(74) *Attorney, Agent, or Firm* — Michael D. Bednarek; Axinn Veltrop & Harkrider LLP

(57) ABSTRACT

In a laser device having at least one gas-purged laser resonator which is arranged in a purging gas circuit which has upstream of the laser resonator both a low pressure generator for generating a purging gas excess pressure in the purging gas circuit and, between the low pressure generator and the laser resonator, a cleaning device for cleaning the purging gas, the purging gas being air, according to the invention the purging gas circuit has downstream of the laser resonator between the laser resonator and the low pressure generator an intake opening which is permanently open towards the atmosphere, the purging gas pressure ($p_1$) generated by the low pressure generator being greater than the atmospheric air pressure ($p_0$).

13 Claims, 1 Drawing Sheet

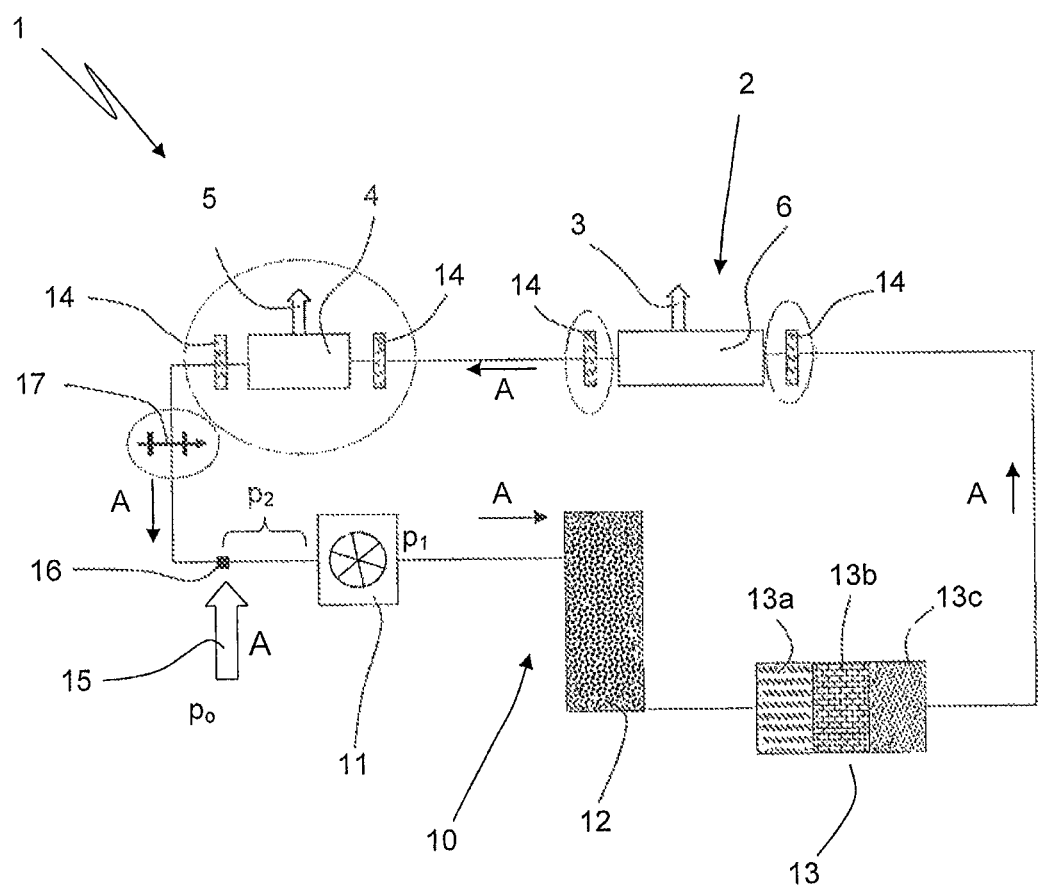

LASER DEVICE HAVING A GAS-PURGED LASER RESONATOR

This application is a national stage application of International Application No. PCT/EP2012/057129 (WO 2012/143423 A1), filed Apr. 19, 2012 which is herein incorporated by reference in its entirety.

BACKGROUND

1. Field of the Invention

The invention relates to a laser device having at least one gas-purged laser resonator which is arranged in a purging gas circuit which has upstream of the laser resonator both a low pressure generator for generating a purging gas excess pressure in the purging gas circuit and, between the low pressure generator and the laser resonator, a cleaning device for cleaning the purging gas.

2. Description of Related Art

Such a laser device having a gas-purged laser resonator is disclosed, for example, in U.S. 2003/0227957 A1.

Material processing requires lasers with high power and good beam quality which have a high level of stability over a long period of time. A possible source which can lead to instabilities during laser operation are occurrences of contamination (particles, moisture, organic compounds) in the laser device. Contamination may be deposited in the laser resonator and in the pump unit on components, such as, for example, mirrors and lead to wear or cause disruptions so that the beam quality or the power is reduced during operation. This can be prevented or minimised by purging the laser resonator and the pump unit with gas.

Conventional gas purging devices comprise in a first variant a compressor and a membrane dryer for air preparation and are generally configured for a significantly higher volume flow. In this instance, purging gas is drawn from the environment via an air preparation unit, prepared and directed through the laser resonator and the pump unit and discharged into the environment again at the end. The purging gas is permanently drawn from the environment and must therefore also be continuously cleaned. It is disadvantageous that the components are expensive and susceptible to wear.

In a second variant, purging gas from bottles having a defined quality, for example, nitrogen, is used. This is permanently drawn from the bottle, prepared, directed through the laser resonator and the pump unit and discharged to the environment again at the end.

A laser resonator having gas purging is disclosed in U.S. 2003/0007537 A1. This system comprises a closed housing (laser resonator), from which gas is drawn in a first step. This gas contains occurrences of contamination, such as, for example, water vapour, organic compounds and small particles. In order to remove these occurrences of contamination, the gas is guided in a second step through a preparation system in which the cleaning is carried out in various steps in the following sequence: firstly, the gas is passed through a first medium, for example, silica gel, in order to filter the water vapour. Afterwards, the gas passes through an organic filter. There finally follows a particle filter, which serves to separate particles. The cleaned gas is then supplied to the closed housing (laser resonator) again in a third step. The entire system is operated at ambient pressure. Furthermore, the system makes provision for a regeneration of the water vapour filter with dry gas which can be supplied to the filter and discharged from the filter via a separate line.

The laser device known from U.S. 2003/0227957 A1 mentioned in the introduction comprises a laser resonator, which is purged by means of a purging gas, such as, for example, air. The purging gas is guided in a closed circuit, in which cleaning devices are also provided in order to clean the purging gas, the purging gas pressure in the laser resonator being maintained at ambient pressure. Prior to the actual laser operation, the entire gas purging system is flooded with nitrogen in order to remove contaminations present therein and to reduce the oxygen content, and afterwards purged with the purging gas.

A disadvantage of these known gas purging systems is that they are operated at ambient pressure. Hermetically sealing a closed housing is a great challenge and cannot always be implemented. It is thus possible, in the event of leaks, for contamination from the environment to enter the gas purging system and to be able to be deposited on laser components without being filtered from the purging gas beforehand, whereby the stability of the laser operation may be impaired.

SUMMARY

In this regard, an object of the invention is to develop a laser device having a gas-purged laser resonator in such a manner that, to the greatest possible extent, no contamination from the environment is able to enter the gas purging system.

This object is achieved according to the invention with a laser device having at least one gas-purged laser resonator that is arranged in a purging gas circuit that has, upstream of the laser resonator, both a low pressure generator for generating a purging gas excess pressure in the purging gas circuit and, between the low pressure generator and the laser resonator, a cleaning device for cleaning the purging gas, the purging gas being air. The purging gas circuit has, downstream of the laser resonator between the laser resonator and the low pressure generator, an intake opening which is permanently open towards the atmosphere, the purging gas pressure ($p_1$) generated by the low pressure generator is greater than the atmospheric air pressure ($p_0$).

According to the invention, the gas purging is carried out with a purging gas circuit which has an external air intake for compensating for leakage losses in the purging gas circuit. This purging gas circuit is operated downstream of the low pressure generator as far as a location upstream of the intake opening with a slight excess pressure and with a defined leakage rate. For all the components in the purging gas circuit, a maximum leakage rate is defined. A defined but low leakage rate covers production tolerances and leads to a correspondingly long service-life of the drying agent supply and the filter for particles and organic materials in the purging gas circuit. At the same time, an excess pressure in the laser resonator and in the pump unit is always ensured. Owing to the use of a throttle in the backflow upstream of the intake opening, the circuit air quantity can be finely adjusted. The purging gas which is lacking owing to the leakage rate is supplied to the purging gas circuit again automatically via the purging gas intake which is outwardly open in a pressure-free state. Owing to the excess pressure upstream of the throttle and the discharge filter of the last consumer, it is ensured that no contamination from the environment can reach the system. It is thus possible to ensure stable laser operation and a long service-life of the purging system.

In another aspect, the invention also relates to a method for purging a laser resonator of a laser device as set out above, with the following method step:

compensating for a purging gas leakage loss which occurs between the low pressure generator downstream as far as the intake opening by means of ambient air which is drawn via the intake opening owing to the reduced pressure which exists between the intake opening and the low pressure generator with respect to the atmospheric air pressure.

Other advantages of the invention will be appreciated from the description and the drawing. The above-mentioned features and those set out below can also be used individually or together in any combination. The embodiment shown and described is not intended to be understood to be a conclusive listing but is instead of exemplary nature for describing the invention.

BRIEF DESCRIPTION OF THE DRAWINGS

FIG. 1 is a schematic illustration of a laser device having the purging gas circuit according to the invention.

DETAILED DESCRIPTION

The laser device 1 shown comprises a gas-purged laser resonator 2 having a solid-state laser medium 6 which is provided therein in order to produce a laser beam 3, a gas-purged pump unit 4 for optically pumping the laser resonator 2 and a closed purging gas circuit 10 in which the laser resonator 2 and the pump unit 4 are arranged. The pump light produced by the pump unit 4 is designated 5. The purging gas guided in the purging gas circuit 10 is air and serves to purge the laser resonator 2 and the pump unit 4 in order to reduce contamination present therein (particles, moisture, organic compounds).

Upstream of the laser resonator 2, the purging gas circuit 10 has both a low pressure generator 11 for generating a purging gas excess pressure in the purging gas circuit 10 and between the low pressure generator 11 and the laser resonator 2 a cleaning device 12, 13 for cleaning the purging gas A circulating in the purging gas circuit 10. It is possible to use, for example, air as a purging gas, but gases with a different composition are also conceivable. The low pressure generator 11 which is constructed, for example, as a ventilator/fan serves to generate an excess pressure in the region of approximately from 100 Pa to 5500 Pa in the purging gas circuit 10. The cleaning device may have a drying means 12, for example, zeolite or silicate gel, in order to separate water vapour contained in the purging gas A. In order to filter particles of different sizes in an optimum manner, the cleaning device may further have a multi-stage particle filter 13a, an activated carbon filter 13b for cleaning organic components and a final extremely fine filter 13c. Alternatively or in addition, it is also possible to use other filters, such as, for example, a combination of UV-LED and molecular sieve or a cold trap for cleaning the organic components. Additional particle filters (fine filters) 14 may optionally be used directly upstream and downstream of the laser resonator 2 and the pump unit 3. Particle contamination on the path from the extremely fine filter 13c to the resonator 2 is thus in particular prevented.

Downstream of the laser resonator 2, the purging gas circuit 10 has between the pump unit 4 and the low pressure generator 11 an intake opening 16 which is open in the direction towards the atmosphere 15 and which serves to draw in external air in order to compensate for leakage losses in the purging gas circuit 10. The purging gas pressure $p_1$ generated by the low pressure generator 11 is greater than the atmospheric air pressure $p_0$. A purging gas leakage loss which occurs downstream between the low pressure generator 11 as far as the intake opening 16 leads between the intake opening 16 and the low pressure generator 11 to a reduced pressure $p_2$ with respect to atmospheric air pressure $p_0$ ($p_2<P_0$) and is automatically compensated for by ambient air A, which is drawn via the intake opening 16 owing to this reduced pressure $p_2$.

In order to eliminate increased contamination in the laser resonator 2 owing to uncleaned air which enters the purging gas circuit 10 from the exterior, the system is operated with a slight excess pressure and with a defined leakage rate. A leakage rate of a maximum of 10% per passage through the laser system has been found to be particularly advantageous. Owing to the leakage losses in the laser device 1 and the pressure increase via the low pressure generator 11, air is automatically supplied to the purging gas circuit 10 via the intake opening 16. Thus, the intake quantity is automatically adjusted in accordance with the leakage rate in the purging gas circuit 10 without complex control units on valves.

Gas purging circuits having a plurality of gas-purged laser resonators which are arranged in series or parallel with each other and having a plurality of gas-purged pump units which are arranged in series or in parallel with each other are also conceivable. During normal operation of the gas purging system, a throughput in the range from 5-100 liters per hour is used. If the laser device 1 comprises a plurality of laser resonators 2 or pump units 4, the gas consumption may increase accordingly. Optionally, a throttle 17 may be fitted for system compensation upstream of the suction opening 16 in order to be able to handle production-related throughput fluctuations of the purging gas and laser resonators which are different with respect to the purging gas throughput with the same purging gas circuit 10.

When the laser device 1 is switched on, the laser resonator 2 is intended to be purged for a period of time in order to ensure that the contamination which has accumulated during the service-life, in particular moisture, is forced out of the purging gas circuit 10. In order to shorten the starting phase of the laser operation, it is possible to use a boost mode. This enables quicker, more efficient purging of the laser device 1 in order to thus more rapidly achieve the desired conditions in the laser device 1 during the switching-on operation. In this instance, for the period of the starting phase, that is to say, before the laser operation, the purging gas circuit 10 is operated with an increased gas flow. This can be controlled by means of the low pressure generator 11. Advantageously in this instance, a gas flow which corresponds to a multiple of the normal operation is used. A range from 5 to 20 times has been found to be advantageous. In order to prevent negative influences as a result of gas flows in the purging gas circuit 10 and in order to manage with a minimum purging gas consumption (output at the leakages) and thus to increase the service-life of the system, a smaller gas flow is used in the purging gas circuit 10 during laser operation.

It has also been found that the gas purging is not required over the entire duration of laser operation. This enables a selective switching-off and switching-on of the purging gas circuit 10, regardless of the laser operation. The intermittent switching-off and switching-on is controlled by the low pressure generator 11. It can be switched off and switched on again in a time-controlled manner after a defined period of time or instead be controlled via one or more sensors (for example, humidity sensors).

Alternatively, a pre-filter could also be fitted between the intake opening 16 and the drying agent 12, and the filter 13c could be omitted at the filter stage 13.

What is claimed is:

1. Laser device having at least one gas-purged laser resonator, which is arranged in a purging gas circuit that has upstream of the laser resonator both a low pressure generator for generating a purging gas excess pressure in the purging gas circuit and, between the low pressure generator and the laser resonator, a cleaning device for cleaning the purging gas, the purging gas being air, characterized in that the purging gas circuit has downstream of the laser resonator, between the laser resonator and the low pressure generator, an intake opening that is permanently open towards the atmosphere to compensate for a purging gas leakage loss in the purging gas circuit downstream of the low pressure generator, the purging gas pressure (p1) generated by the low pressure generator being greater than the atmospheric air pressure (p0).

2. Laser device according to claim 1, characterized in that the cleaning device has a drying agent for separating water vapor contained in the purging gas.

3. Laser device according to claim 1, characterized in that the purging gas circuit has a particle filter directly upstream of the laser resonator for filtering the purging gas.

4. Laser device according to claim 3, characterized in that the purging gas circuit is upstream of the intake opening having a throttle between the laser resonator and the intake opening.

5. Laser device according to claim 1, wherein at least one gas-purged pump unit is arranged in the purging gas circuit in order to pump the laser resonator.

6. Laser device according to claim 5, characterized in that the pump unit is arranged in the purging gas circuit downstream of the laser resonator between the laser resonator and the intake opening.

7. Laser device according to claim 1, characterized in that the leakage rate of the purging gas circuit between the low pressure generator downstream as far as the intake opening is a maximum of 10% per passage through the purging gas circuit.

8. Laser device according to claim 1, characterized in that a plurality of gas-purged laser resonators which are arranged in series or in parallel are arranged in the purging gas circuit.

9. Laser device according to claim 1, characterized in that a plurality of gas-purged pump units which are arranged in series or in parallel relative to each other are arranged in the purging gas circuit.

10. Method for purging a laser resonator of a laser device according to claim 1, with a purging gas, characterized by:

compensating for a purging gas leakage loss which occurs between the low pressure generator downstream as far as the intake opening by means of ambient air (A) that is drawn via the intake opening owing to the reduced pressure (p2) that exists between the intake opening and the low pressure generator with respect to the atmospheric air pressure (p0).

11. Method according to claim 10, characterized in that the leakage rate of the purging gas circuit present downstream of the low pressure generator as far as a location upstream of the intake opening is a maximum of 10% per passage through the purging gas circuit.

12. Laser device according to claim 1, characterized in that the cleaning device has at least one particle filter for filtering the purging gas.

13. Laser device according to claim 1, characterized in that the purging gas circuit has a particle filter directly downstream of the laser resonator for filtering the purging gas.

* * * * *